March 31, 1959  L. E. PUCHER ET AL  2,880,258
METHOD OF MAKING NEGATIVE ELECTRODES FOR ELECTRIC BATTERIES
Filed Jan. 7, 1955
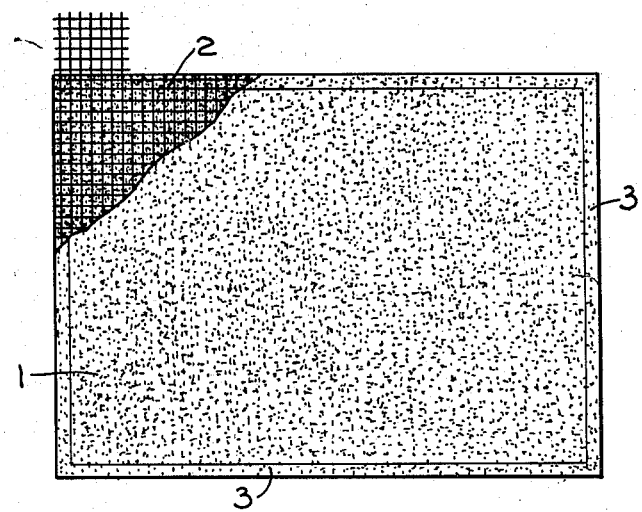
INVENTORS
LEO E. PUCHER
WILLIAM A. CUNNINGHAM
JOSEPH F. SZABO
BY
ATTORNEY 2,880,258
METHOD OF MAKING NEGATIVE ELECTRODES FOR ELECTRIC BATTERIES Leo E. Pucher and William A. Cunningham, South Euclid, and Joseph F. Szabo, Willowick, Ohio, assignors to The Electric Storage Battery Company, a corporation of New Jersey Application January 7, 1955, Serial No. 480,621

3 Claims. (Cl. 136—30)

The present invention relates to batteries and, more particularly, to batteries in which the active material of the negative electrodes or plates is or comprises highly reactive sponge zinc.

This application is a continuation-in-part of our earlier filed application Serial No. 390,709, filed November 6, 1953, now abandoned, for Method of Making Negative Electrodes for Electric Batteries.

The principal object of the invention is the provision of a novel and improved method of making a battery negative electrode or plate, the active material of which is or comprises highly reactive sponge zinc, which electrode or plate when incorporated in a battery with a positive plate, the active material of which is or comprises silver oxide, peroxide and/or other so-called higher oxides of silver will have high capacity per unit volume, a high discharge rate, will reach full discharge voltage very quickly as compared to prior batteries, and will have a low self-discharge rate resulting in long shelf life.

The invention further resides in certain novel methods of procedure and features of the construction and further objects and advantages of the invention will be apparent to those skilled in the art to which it pertains from the following disclosure and description of the preferred embodiment of the invention.

In the accompanying drawing, there is shown the negative electrode or plate of the present invention which comprises as its active material sponge zinc 1 supported on or carried by a suitable supporting grid 2, preferably formed of copper, bronze or silver wire gauze or screen, which may be covered or plated with a hard, non-porous zinc coating. It will be understood that the grid can be formed of other metals generally used in alkaline type batteries and which are of satisfactory conductivity. The coating can be produced by plating from an alkaline-cyanide bath prior to the application of the zinc active material thereto. The zinc coating or plating on the grid is much harder than the sponge zinc active material of the electrode or plate and serves to prevent galvanic action between the grid metal and the sponge zinc, thereby reducing the self-discharge of the plate. The coating also increases the cycling life of the electrodes or plates and, in turn, the batteries in which they are incorporated.

According to the method of the present invention, the negative electrodes or plates are made by pasting grids with a paste made by mixing powdered zinc oxide (reagent grade) with a solution of potassium hydroxide. Although the solution is preferably about 30% to 35% potassium hydroxide, it is to be understood that solutions from about 5% to a saturated solution, generally stated to be 52% at 80° F. can be used. The paste should be kept covered and used as soon as possible after mixing so as to avoid, as well as possible, absorption of carbon dioxide from the atmosphere. After the grids are pasted, the plates are air-dried at room temperature for from 2 to 6 hours, depending upon their thickness. The plates are subsequently cathodically formed in a potassium hydroxide solution of from about 3% to about 25%, a 5% solution being preferred. The use of potassium hydroxide in the mix produces a paste which on drying definitely hardens or sets. This setting of the paste is due to the formation of a potassium-zinc complex, possibly a potassium zincate. By virtue of the setting property of the paste, the unformed active material does not slough or shed during the formation as is experienced with a zinc oxide water-paste. This, together with our novel method of formation increases the ultimate capacity of the battery through the production of a porous, highly-reactive sponge zinc negative plate.

For the cathodical formation of the zinc oxide to sponge zinc, an equal number of positive and negative electrodes or plates may be assembled into a battery or cell element with adjacent electrodes separated from one another by suitable insulators or separators. Complete formation of the end plates in a formation element can be assured by including in the assembly nickel screen or gauze "dummy" plates as end-positive and end-negative plates, respectively. Alternatively, the electrodes or plates may be formed against "dummy" electrodes.

The plates may be formed in any suitable manner. They are, however, preferably formed in a 5% potassium hydroxide solution. During formation, the zinc oxide of the negative plate paste is reduced to sponge zinc. The negative plate formation is generally complete when the formation-cell voltage reaches a maximum value and then either remains constant or decreases slightly.

It has been found that after formation, the electrodes or plates of the present invention may be washed for long periods of time without detriment or damage in ordinary tap water. Preferably, the plates are washed for about 2 hours or more in cold, running tap water (but no colder than about 45° F.), then blotted and air-dried in a circulating air chamber. Thorough washing is essential to assure the removal of all potassium hydroxide from the plate. The lowest washing temperature is about 45° F. because below this temperature, the zinc sponge contracts sufficiently to entrap potassium hydroxide, which would eventually cause oxidation of the zinc.

The edges 3 of the plates are preferably pressed heavily just prior to assembly. This flattens any jagged edges, protruding wires, or other irregularities, thereby reducing possibilities of short-circuits in the finished cell. The plates are also preferably pressed lightly over their entire surfaces to smooth out any high spots or lumps which might cause short-circuits. This is particularly desirable if the plates are over-pasted or very thick.

From the foregoing description, it will be apparent that the objects heretofore enumerated and others have been accomplished. The sponge zinc of the plates of the present invention adheres tightly to the grids or screens and does not fall off. The plates have high cycling life, good charge retention, good capacity at high rates of discharge, high discharge voltage, and are easy to manufacture.

While the preferred construction of the negative battery electrode or plate of the present invention and the preferred method of its manufacture has been described in considerable detail, it will be apparent to those skilled in the art to which the invention relates that changes may be made both in the construction and in the method of manufacture described within the scope of the present invention and it is the intention to cover hereby all adaptations and modifications thereof within the scope of the appended claims.

Having thus described our invention, we claim:
1. The method of making a dense, light, porous negative electrode or plate for use in a battery cell which comprises forming a paste by mixing powdered zinc oxide with 30% to 35% potassium hydroxide solution, pasting the mixture onto a metallic screen consisting of a metal selected from the group consisting of copper, bronze and silver provided with a hard non-porous coating of zinc, subsequently forming the plate cathodically to convert the zinc oxide to sponge zinc, and washing said electrode.

2. The method of making a dense, light, porous negative electrode or plate for use in a battery cell which comprises forming a paste by mixing powdered zinc oxide with 30% to 35% potassium hydroxide solution, pasting the mixture upon a screen consisting of a metal selected from the group consisting of copper, bronze and silver provided with a hard non-porous coating of zinc, subsequently forming the plate in a 5% potassium hydroxide solution to convert the zinc oxide to sponge zinc, and washing the plate in water above about 45° F. for not less than two hours to remove all traces of potassium hydroxide.

3. The method of making a dense, light, porous negative electrode or plate for use in a battery cell which comprises forming a paste by mixing powdered zinc oxide with a potassium hydroxide solution, of above about 5% in strength, pasting the mixture onto a metallic screen consisting of a metal selected from the group consisting of copper, bronze and silver provided with a hard non-porous coating of zinc, subsequently forming the plate cathodically to convert the zinc oxide to sponge zinc, and washing said electrode.

References Cited in the file of this patent

UNITED STATES PATENTS

| | | |
|---|---|---|
| 2,561,943 | Moulton | July 24, 1951 |
| 2,594,709 | Andre | Apr. 29, 1952 |
| 2,594,710 | Andre | Apr. 29, 1952 |
| 2,662,928 | Brennan | Dec. 15, 1953 |
| 2,724,734 | Howard | Nov. 22, 1955 |